US012444532B2

(12) United States Patent
Furukawa et al.

(10) Patent No.: US 12,444,532 B2
(45) Date of Patent: Oct. 14, 2025

(54) INDUCTOR

(71) Applicant: NITTO DENKO CORPORATION, Osaka (JP)

(72) Inventors: Yoshihiro Furukawa, Osaka (JP); Keisuke Okumura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 1039 days.

(21) Appl. No.: 17/381,745

(22) Filed: Jul. 21, 2021

(65) Prior Publication Data

US 2022/0028599 A1 Jan. 27, 2022

(30) Foreign Application Priority Data

Jul. 27, 2020 (JP) ................................ 2020-126344

(51) Int. Cl.

*H01F 27/28* (2006.01)
*H01F 27/24* (2006.01)
(Continued)

(52) U.S. Cl.

CPC ......... *H01F 27/2823* (2013.01); *H01F 27/24* (2013.01); *H01F 27/32* (2013.01);
(Continued)

(58) Field of Classification Search

CPC ......... H01F 27/2804; H01F 2027/2809; H01F 17/0013; H01F 17/0006; H01F 5/003;
(Continued)

(56) References Cited

U.S. PATENT DOCUMENTS 5,515,022 A * 5/1996 Tashiro ............... H01F 17/0013 336/200
2010/0265030 A1* 10/2010 Weekamp .......... H01F 17/0006 29/606

(Continued)

FOREIGN PATENT DOCUMENTS

EP 1427030 A2 * 6/2004 ............. H01G 4/228
JP 2014-078546 A 5/2014

(Continued)

OTHER PUBLICATIONS

Office Action, issued by the Japanese Patent Office on Jan. 9, 2024, in connection with Japanese Patent Application No. 2020-126344.

(Continued)

*Primary Examiner* — Tszfung J Chan
(74) *Attorney, Agent, or Firm* — Edwards Neils LLC; Jean C. Edwards, Esq.

(57) ABSTRACT

An inductor includes a wire and a magnetic layer which has a via, having an inner peripheral surface. On a cross-section across the via, a first point and a second point are located at one side and the other side in a direction in which the first principal surface extends and are kept 50 μm away from a first edge on one side of the inner peripheral surface in the thickness direction, and a third point and a fourth point are located at one side and the other side in the extending direction and are kept 50 μm away from a second edge on the other side of the inner peripheral surface in the thickness direction. An area of a quadrangle having all four points as vertices and an area of the molten solid inside the quadrangle are obtained, along with a percent (S1/S0×100) of the area.

11 Claims, 13 Drawing Sheets

(51) Int. Cl.

| | |
|---|---|
| ***H01F 27/32*** | (2006.01) |
| ***H01F 41/02*** | (2006.01) |
| ***H01F 41/066*** | (2016.01) |
| *H01F 17/00* | (2006.01) |

(52) U.S. Cl.
CPC ....... *H01F 41/0206* (2013.01); *H01F 41/066* (2016.01); *H01F 2017/002* (2013.01)

(58) Field of Classification Search
CPC ...... H01F 27/2823; H01F 27/24; H01F 27/32; H01F 2017/002
USPC .................................................. 336/200, 232
See application file for complete search history.

(56) References Cited

U.S. PATENT DOCUMENTS

| | | | |
|---|---|---|---|
| 2015/0116950 A1 | 4/2015 | Yoo et al. | |
| 2015/0235753 A1 | 8/2015 | Chatani et al. | |
| 2017/0148562 A1 | 5/2017 | Lee et al. | |
| 2017/0169936 A1 | 6/2017 | Ishida et al. | |
| 2017/0352475 A1 | 12/2017 | Ishida | |
| 2019/0103208 A1* | 4/2019 | Jung | H01F 27/292 |
| 2020/0051728 A1* | 2/2020 | Matsumoto | H01F 17/0013 |
| 2021/0037640 A1 | 2/2021 | Furukawa et al. | |
| 2021/0100104 A1* | 4/2021 | Sung | H01F 17/0013 |

FOREIGN PATENT DOCUMENTS

| | | | | |
|---|---|---|---|---|
| JP | 2015-088753 | A | | 5/2015 |
| JP | 2015-199131 | A | | 11/2015 |
| JP | 2017-098544 | A | | 6/2017 |
| JP | 2017-112130 | A | | 6/2017 |
| JP | 2017-216401 | A | | 12/2017 |
| JP | 2019-160929 | A | | 9/2019 |
| JP | 2019-165221 | A | | 9/2019 |
| JP | 2019-165222 | A | | 9/2019 |
| JP | 2019-186365 | A | | 10/2019 |
| JP | 2020088285 | A | * | 6/2020 |
| KR | 10-2016-0052423 | A | | 5/2016 |
| WO | 2014/038706 | A1 | | 3/2014 |

OTHER PUBLICATIONS

Office Action, issued by the Korean Intellectual Property Office on May 9, 2025, in connection with Korean Patent Application No. 10-2021-0093884.

* cited by examiner

INDUCTOR

The present application claims priority from Japanese Patent Application No. 2020-126344 filed on Jul. 27, 2020, the contents of which are hereby incorporated by reference into this application.

TECHNICAL FIELD

The present invention relates to an inductor.

BACKGROUND ART

Conventionally, an inductor including a wire and a magnetic layer covering the wire has been known (for example, see Patent Document 1 below). The magnetic layer of Patent Document 1 contains magnetic particles. The inductor of Patent Document 1 further includes a slit. The slit is formed in the magnetic layer between the wires. The slit is formed with a laser.

CITATION LIST

Patent Document

Patent Document 1: Japanese Unexamined Patent Publication No. 2019-186365

SUMMARY OF THE INVENTION

Problem to be Solved by the Invention

However, to electrically connect the wire to an external device, a via is formed in the inductor and a plated layer is formed inside the via in some cases. The via penetrates from the surface of the inductor toward the wire.

However, when the via is formed by the method of Patent Document 1, the irradiation of the laser to the magnetic layer causes a large amount of molten solid of the magnetic particles to remain on the inner peripheral surface of the via. Accordingly, there is a disadvantage that the large amount of molten solid hinders the stable formation of a plated layer inside the via.

The present invention provides an inductor with a small amount of molten solid.

Means for Solving the Problem

The present invention [1] includes an inductor comprising: a wire, and a magnetic layer embedding the wire and containing magnetic particles, wherein the magnetic layer has a first principal surface disposed at one side relative to the wire in a thickness direction with a space between the first principal surface and the wire, a second principal surface disposed at an opposite side of the first principal surface relative to the wire with a space between the first principal surface and the second principal surface in a thickness direction, and a via penetrating from the first principal surface toward the wire, the via has an inner peripheral surface having an endless shape when being viewed in the thickness direction, and a percent of molten solid obtained by a method described below is 10% or less.

On a cross-section across the via, a first point and a second point are located at one side and the other side in a direction in which the first principal surface extends and are kept 50 μm away from an edge on one side of the inner peripheral surface in the thickness direction, and a third point and a fourth point are located at one side and the other side in the extending direction and are kept 50 μm away from an edge on the other side of the inner peripheral surface in the thickness direction. An area S0 of a quadrangle having the first point, the second point, the third point, and the fourth point as vertices is obtained. An area S1 of the molten solid located inside the quadrangle is obtained. A percent (S1/S0× 100) of the area S1 of the molten solid to the area S0 of the quadrangle is obtained.

The inductor has a small amount of molten solid. Thus, a conductive member can stably be formed in the via.

The present invention [2] includes the inductor described in [1] above, wherein the number of steps on the inner peripheral surface in the via is 1 or less.

In the inductor, the number of steps is 1 or less, namely, small. Thus, the conductive member can even more stably be formed in the via.

The present invention [3] includes the inductor described in [1] or [2] above, wherein the inner peripheral surface has a tapered surface where a cross-sectional area of an opening of the via gradually increases toward the first principal surface.

The inductor has a tapered surface where the cross-sectional area of the opening of the via gradually increases. Thus, when the via is filled with a conductive member, the area of one side of the conductive member in a thickness direction can be increased. Therefore, the inductor has excellent reliability of the connection to an external device.

The present invention [4] includes the inductor described in any one of the above-described [1] to [3], wherein a one-side surface of the wire in the thickness direction exposed from the via has a flat shape on a cross section on which the wire extends.

In the inductor, in a cross-sectional view taken along a first direction, a one-side surface of the wire in the thickness direction is exposed from the via and has a flat shape. Thus, the conductive member can stably be formed.

The present invention [5] includes the inductor described in any one of the above-described [1] to [4], wherein the wire includes a conductive wire and an insulating film disposed on a peripheral surface of the conductive wire, and the insulating film is exposed from the via.

In the inductor, the insulating film is exposed from the via and covers the conductive wire. Thus, the deterioration and damage of the conductive wire can be suppressed.

The present invention [6] includes the inductor described in any one of the above-described [1] to [5], further comprising: a process stabilization layer filling the via.

In the inductor, the process stabilization layer fills the via. Thus, the stability when the via is processed can be improved.

The present invention [7] includes the inductor described in [6], wherein the inner peripheral surface has a second tapered surface where a cross-sectional area of an opening of the via gradually decreases toward the first principal surface.

In the inductor, when the via is provided with the conductive member, the anchor effect therebetween can suppress the fall of the conductive member from the via.

The present invention [8] includes the inductor described in any one of the above-described [1] to [4] 1, wherein the wire includes a conductive wire and an insulating film disposed on a peripheral surface of the conductive wire, the insulating film having a protruding edge protruding inwardly from the other edge of the inner peripheral surface in the via, the inductor further includes a process stabilization layer disposed on a one-side surface of the protruding edge in the thickness direction and on the inner peripheral surface, and the protruding edge and the process stabilization layer expose a one-side surface of the conductive wire in the thickness direction.

In the inductor, the process stabilization layer is disposed on a one-side surface of a protruding edge in the thickness direction and on an inner peripheral surface of the protruding edge. Thus, the stability when the one-side surface and inner peripheral surface are processed can be improved. Meanwhile, a one-side surface of the conductive wire in the thickness direction is exposed from the protruding edge and the process stabilization layer. Thus, the conductive wire can surely be connected to an external device.

The present invention [9] includes the inductor described in any one of the above-described [6] to [8], wherein the process stabilization layer is further disposed on the first principal surface.

In the inductor, the process stabilization layer is disposed on the first principal surface. Thus, the processing stability of the first principal surface can be improved.

The present invention [10] includes the inductor described in any one of the above-described [1] to [9], wherein the magnetic particles are soft magnetic particles.

When the magnetic particles are soft magnetic particles, the inductor has excellent inductance.

The present invention [11] includes the inductor described in any one of the above-described [1] to [10], wherein the via has a maximum length D1 and a minimum length D2 in a surface direction orthogonal to the thickness direction, and a ratio (D1/D2) of the maximum length D1 to the minimum length D2 is 10 or less.

In the inductor, the ratio (D1/D2) of the minimum length D2 to the maximum length D1 is small, namely, 10 or less. Thus, the conductive member can stably be formed in the via.

Effects of the Invention

The inductor of the present invention has a small amount of molten solid. Thus, the conductive member can stably be formed in the via.

BRIEF DESCRIPTION OF THE DRAWINGS

FIG. 6A illustrates a step of preparing a magnetic laminate. FIG. 6B illustrates a step of forming a resist. FIG. 6C illustrates a step of forming a via. FIG. 6D illustrates a step of removing the resist. FIG. 6E illustrates the usage of the inductor in which the conductive member is formed in the via.

FIG. 11 depicts an inductor including a via having a second tapered surface.

FIG. 11B depicts an inductor including a via having a process stabilization layer and a second process stabilization layer.

DESCRIPTION OF THE EMBODIMENTS

The first embodiment of the inductor of the present invention will be described with reference to FIG. 1 to FIG. 4.

Figure 2:
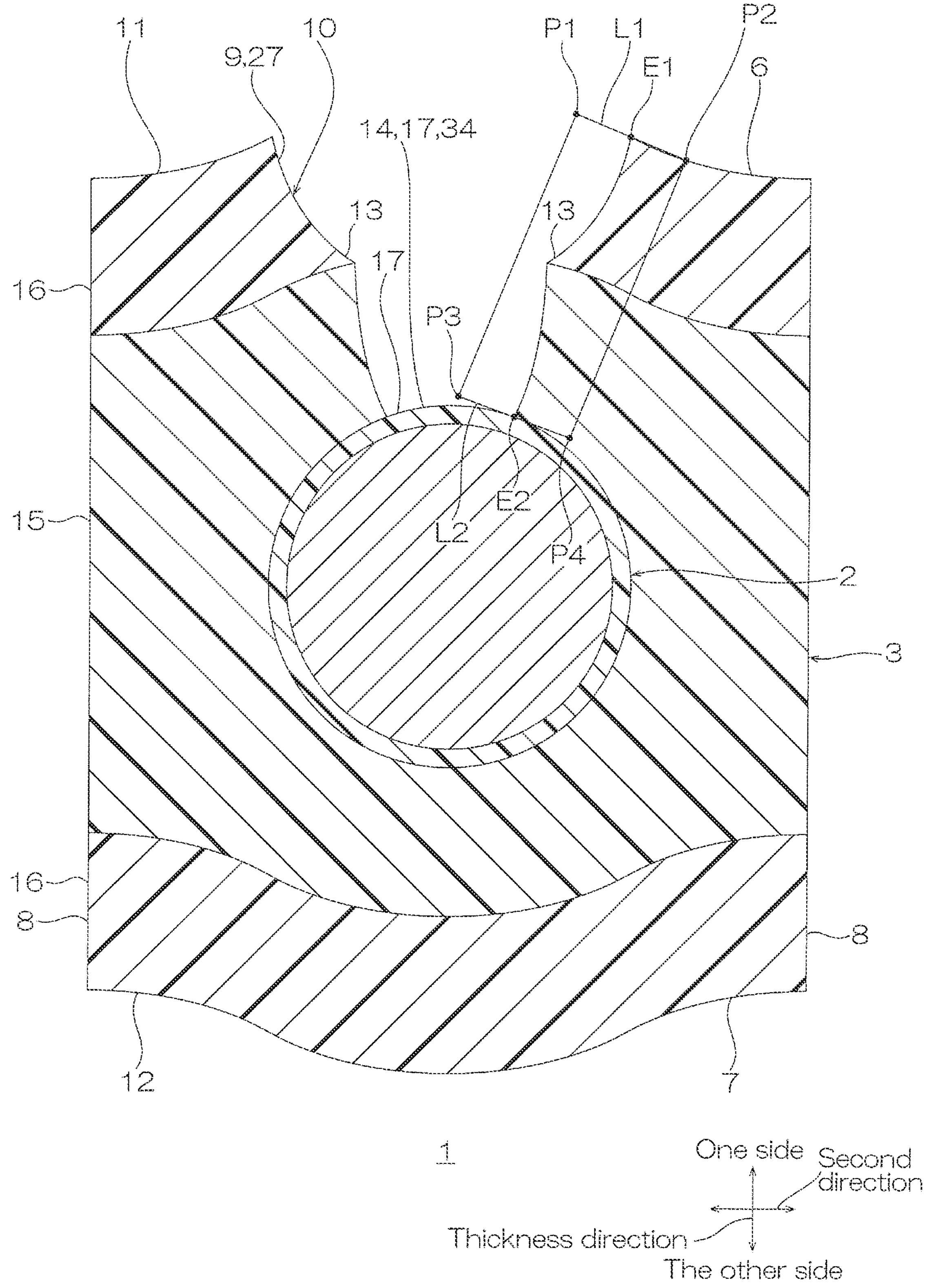
FIG. 2 is a cross-sectional view taken along a second direction of the inductor of FIG. 1.
Figure 3:
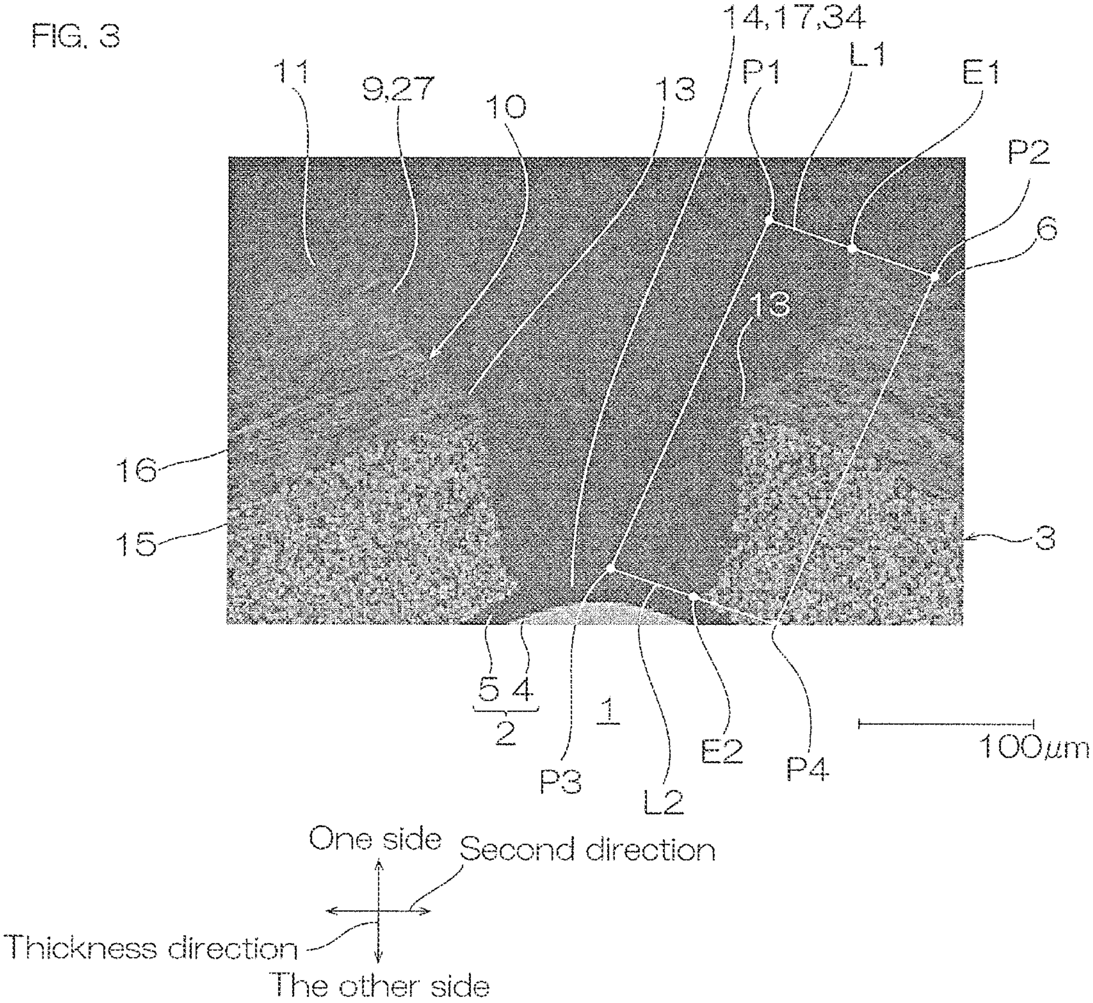
FIG. 3 is a view of a processed image of an SEM picture taken along the second direction of the inductor of the Example 1, corresponding to FIG. 2.
Figure 4:
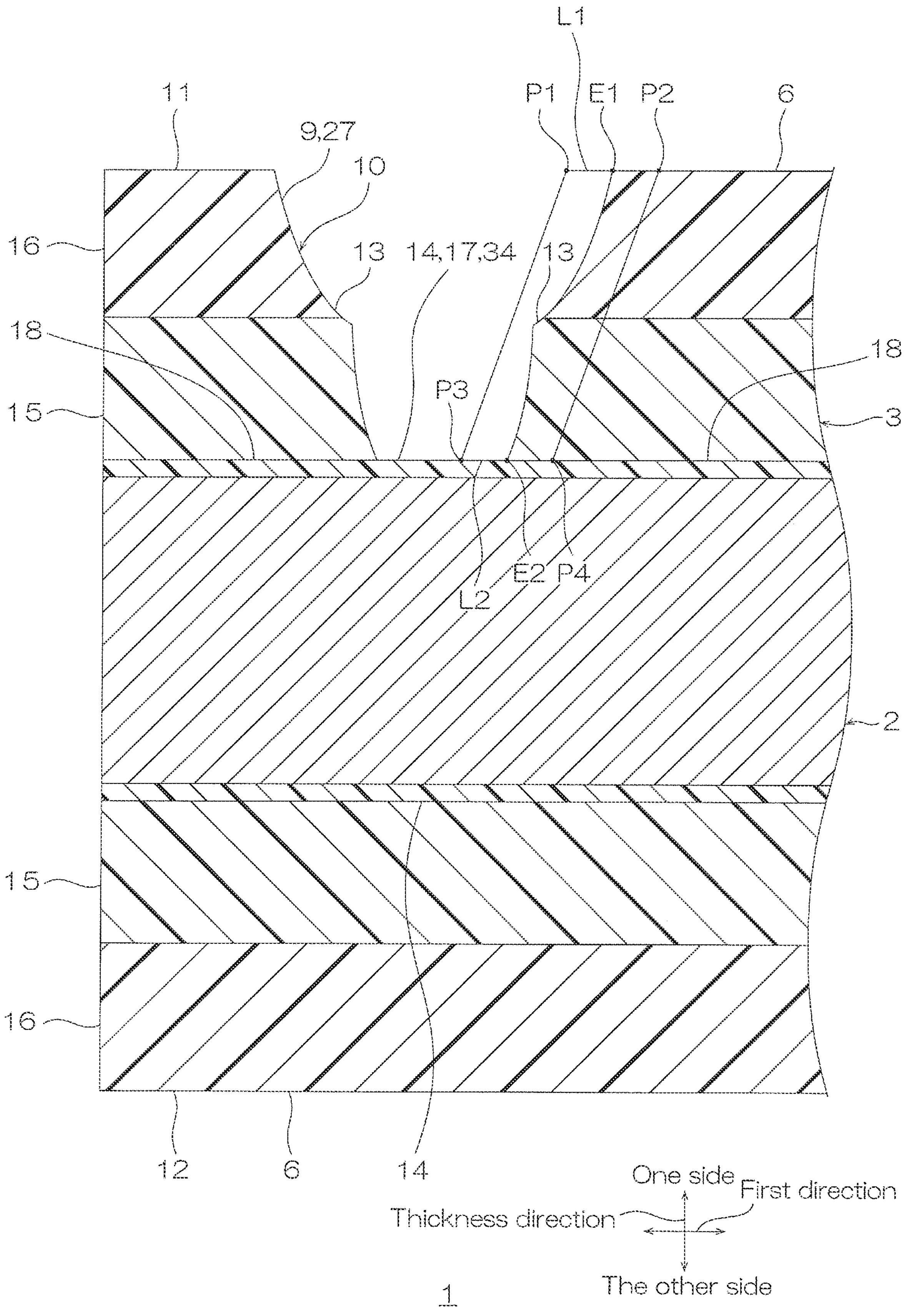
FIG. 4 is a cross-sectional view taken along a first direction of the inductor of FIG. 1.

An inductor 1 has a predetermined thickness and an approximately flat plate shape. The inductor 1 is long in a first direction orthogonal to a thickness direction. The inductor 1 has a rectangular shape in a plan view. As illustrated in FIG. 2 to FIG. 4, the inductor 1 includes a one-side surface 11 and the other-side surface 12. The one-side surface 11 is disposed at one side in the thickness direction, facing the other-side surface 12 with a space therebetween. The inductor 1 includes a wire 2 and a magnetic layer 3.

Figure 1:
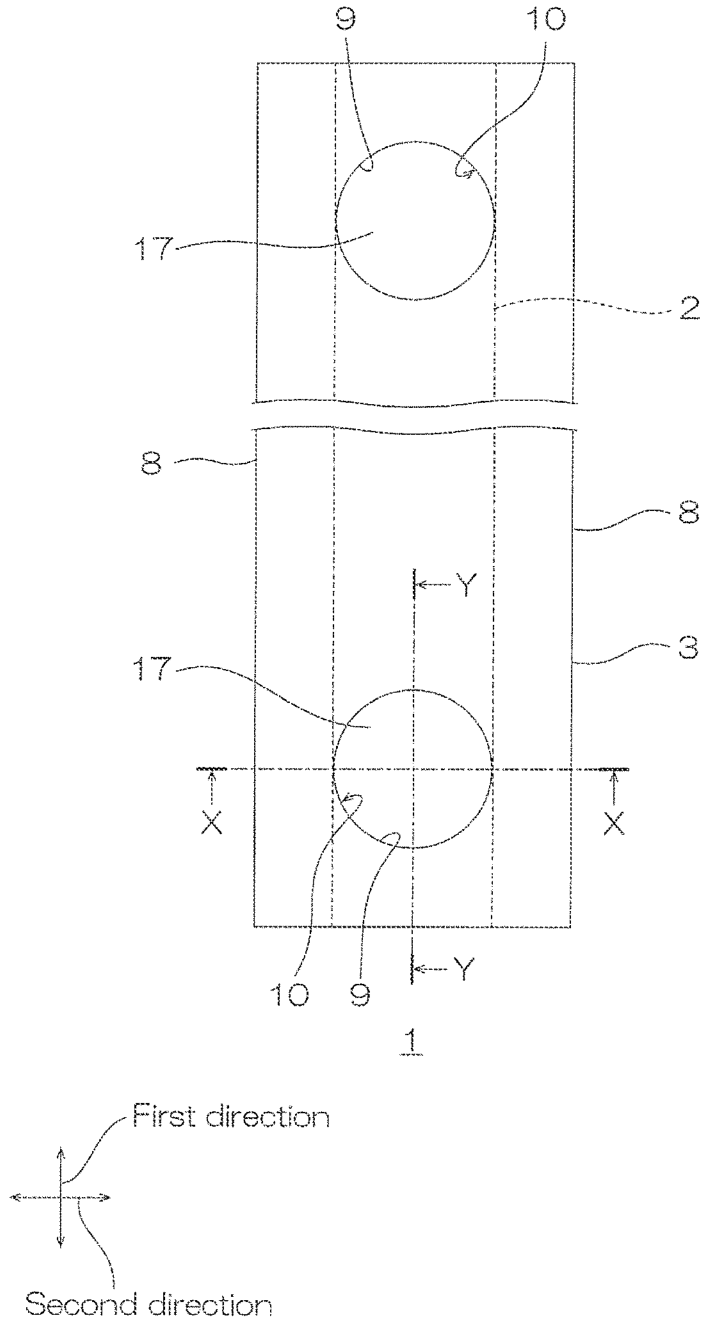
FIG. 1 is a plan view of a first embodiment of the inductor of the present invention.

As illustrated in FIG. 1, the wire 2 extends in the first direction. The shape, dimensions, structures, materials, and formulations (such as filling rate and content) of the wire 2 are described, for example, in Japanese Unexamined Patent Publication No. 2019-220618. As illustrated in FIG. 2 and FIG. 3, the wire 2 has an approximately circular shape in a cross section taken along the thickness direction and a second direction. The second direction is orthogonal to the thickness direction and the first direction.

The wire 2 includes an outer peripheral surface 14 in the above-described cross-section. The wire 2 preferably includes a conductive wire 4 made of a conductor, and an insulating film 5 covering a peripheral surface of the conductive wire 4.

The magnetic layer 3 has the same outer shape as that of the inductor 1 in the plan view. The magnetic layer 3 has a sheet shape extending in the first direction. Further, the magnetic layer 3 embeds the wire 2 in the cross-sectional view. The material of the magnetic layer 3 is a magnetic composition including a binder and magnetic particles. For increasing the inductance of the inductor 1, the magnetic particles are, preferably, soft magnetic particles. A method of forming the magnetic composition and the magnetic layer 3 is described in detail, for example, in Japanese Unexamined Patent Publication No. 2019-165221 and No. 2019-165222. The magnetic layer 3 has a first principal surface 6 as an example of a first principal surface, a second principal surface 7 as an example of a second principal surface, and outer side surfaces 8.

As illustrated in FIG. 2 to FIG. 4, the first principal surface 6 forms a one-side surface of the magnetic layer 3 in the thickness direction. The first principal surface 6 is also the one-side surface 11 of the inductor 1. The first principal surface 6 is disposed at the one side in the thickness direction, facing the wire 2 with a space therebetween. As illustrated in FIG. 2 and FIG. 3, the first principal surface 6 includes a curved surface corresponding to the wire 2.

The second principal surface 7 forms the other-side surface of the magnetic layer 3 in the thickness direction. The second principal surface 7 is also the other-side surface 12 of the inductor 1. The second principal surface 7 faces the other side of the first principal surface 6 with a space therebetween in the thickness direction. The second principal surface 7 is disposed at a side opposite to the first principal surface 6 relative to the wire 2. The second principal surface 7 include a curved surface corresponding to the wire 2.

As illustrated in FIG. 1 to FIG. 2, the outer side surfaces 8 are two side surfaces of the magnetic layer 3, facing each other in the second direction with a space therebetween. The outer side surfaces 8 connect both edges of the first principal surface 6 in the second direction and both edges of the second principal surface 7, respectively.

As illustrated in FIG. 1 to FIG. 3, the magnetic layer 3 includes vias 10. The vias 10 are provided in the magnetic layer 3, corresponding to both edges of the wire 2 in the first direction. Each of the two vias 10 has an approximately circular shape in the plan view. The via 10 penetrates from the one-side surface 11 of the inductor 1 toward the wire 2. The via 10 exposes a one-side surface 34 of an insulating film 5 in the thickness direction. In the outer peripheral surface 14 of the wire 2, the one-side surface 34 in the thickness direction is a part located at the one side in the thickness direction relative to the center. The via 10 includes an inner peripheral surface 9 and a bottom surface 17.

The inner peripheral surface 9 faces the inside of the via 10 in the magnetic layer 3. The inner peripheral surface 9 has an endless shape, as illustrated in FIG. 1, in the plan view (synonymous with "viewed in the thickness direction", and the same applies to the following description). Specifically, the inner peripheral surface 9 has an approximately ringed shape in the plan view. As illustrated in FIG. 2 and FIG. 3, the inner peripheral surface 9 has a tapered surface 27 where the cross-sectional area of the opening of the via 10 gradually increases toward the one-side surface 11. Specifically, the inner peripheral surface 9 composed of the tapered surface 27. The inner peripheral surface 9 has a step 13. The number of the steps 13 is, for example, 1 for each of the vias 10.

The bottom surface 17 faces the vias 10. The bottom surface 17 is a part of the outer peripheral surface 14 of the wire 2. Further, the bottom surface 17 is also the one-side surface 34 of the wire 2 in the thickness direction. The bottom surface 17 continues to an edge (a second edge E2 described below) of the other side of the inner peripheral surface 9 in the thickness direction. As illustrated in FIG. 1, the bottom surface 17 has an approximately circular shape in the plan view. Furthermore, the bottom surface 17 has an approximately arc shape in the cross section taken along the second direction, as illustrated in FIG. 2 and FIG. 3. Furthermore, the bottom surface 17 has a flat shape in the cross section taken along the first direction, as illustrated in FIG. 4. The maximum height of roughness Rz of the bottom surface 17 is, for example, 10 μm or less, preferably 1 μm or less, more preferably 0.1 μm or less and, for example, 0.000001 μm or more. On the other hand, the maximum height of roughness Rz of the covered portion 18 is, for example, 10 μm or less, preferably 1 μm or less, more preferably 0.1 μm or less and, for example, 0.000001 μm or more. The maximum height of roughness Rz is measured, for example, with a laser microscope. The covered portion 18 is a part covered with the magnetic layer 3 of the one-side surface 34 in the thickness direction. To the maximum height of roughness Rz of the covered portion 18, the ratio of the maximum height of roughness Rz of the bottom surface 17 is, for example, less than 2, preferably 1.5 or less, more preferably, 1.1 or less and, for example, 1 or more. When the ratio is the upper limit or less, the excessive roughness of the bottom surface 17 of the via 10 in comparison with the covered portion 18 is suppressed. Thus, a conductive member 19 can even more surely be formed using the via 10.

The magnetic layer 3 may consist of a single layer or multiple layers. When the magnetic layer 3 is multi-layered, the magnetic layer 3 includes, for example, a first layer 15 embedding the wire 2, and two second layers 16. The two second layers 16 are disposed at one side and the other side of the first layer 15 in the thickness direction, respectively. The type and/or ratio of the magnetic particles of the second layer 16 are/is different from those of the first layer 15.

In the inductor 1, the percent of the molten solid M is 10% or less.

The percent of the molten solid M can be obtained by a method described below.

First, as illustrated in FIG. 2 to FIG. 4, on a cross section across the via 10, a first point P1, a second point P2, a third point P3, and a fourth point P4 are set. The first point P1 and the second point P2 are located at one side and the other side in a direction in which the first principal surface 6 extends, keeping 50 μm away from a first edge E1 at one side of the inner peripheral surface 9 in the thickness direction. The third point P3 and the fourth point P4 are located at one side and the other side in the extending direction, keeping 50 μm away from the second edge E2 at the other side of the inner peripheral surface 9 in the thickness direction.

The cross section across the via 10 may be a cross section taken along the second direction as illustrated in FIG. 2 and FIG. 3 or a cross section taken along the first direction as illustrated in FIG. 4.

The first edge E1 is a corner formed of the inner peripheral surface 9 and the first principal surface 6. On the cross section taken along the second direction, the direction in which the first principal surface 6 extends is a tangential direction at the first edge E1 when the first principal surface 6 is a curved surface as illustrated in FIG. 2 and FIG. 3. On the other hand, on the cross section taken along the first direction, the direction in which the first principal surface 6 extends is a direction along the first principal surface 6 when the first principal surface 6 is a flat surface as illustrated in FIG. 4, namely, the first direction.

The second edge E2 is a corner formed of the inner peripheral surface 9 and the outer peripheral surface 14 of the wire 2. The reference direction for setting the third point P3 and the fourth point P4 based on the second edge E2 is the same as the reference direction for setting the first point P1 and the second point P2. Thus, a first line segment L1 connecting the first point P1 and the second point P2 runs parallel to a second line segment L2 connecting the third point P3 and the fourth point P4. In this manner, a quadrangle having the first point P1, second point P2, third point P3 and fourth point P4 as its vertices is formed. The quadrangle is a quadrilateral with parallel two sides (the first line segment L1 and the second line segment L2), namely, a parallelogram.

Subsequently, an area S0 of the quadrilateral is obtained.

Figure 5:
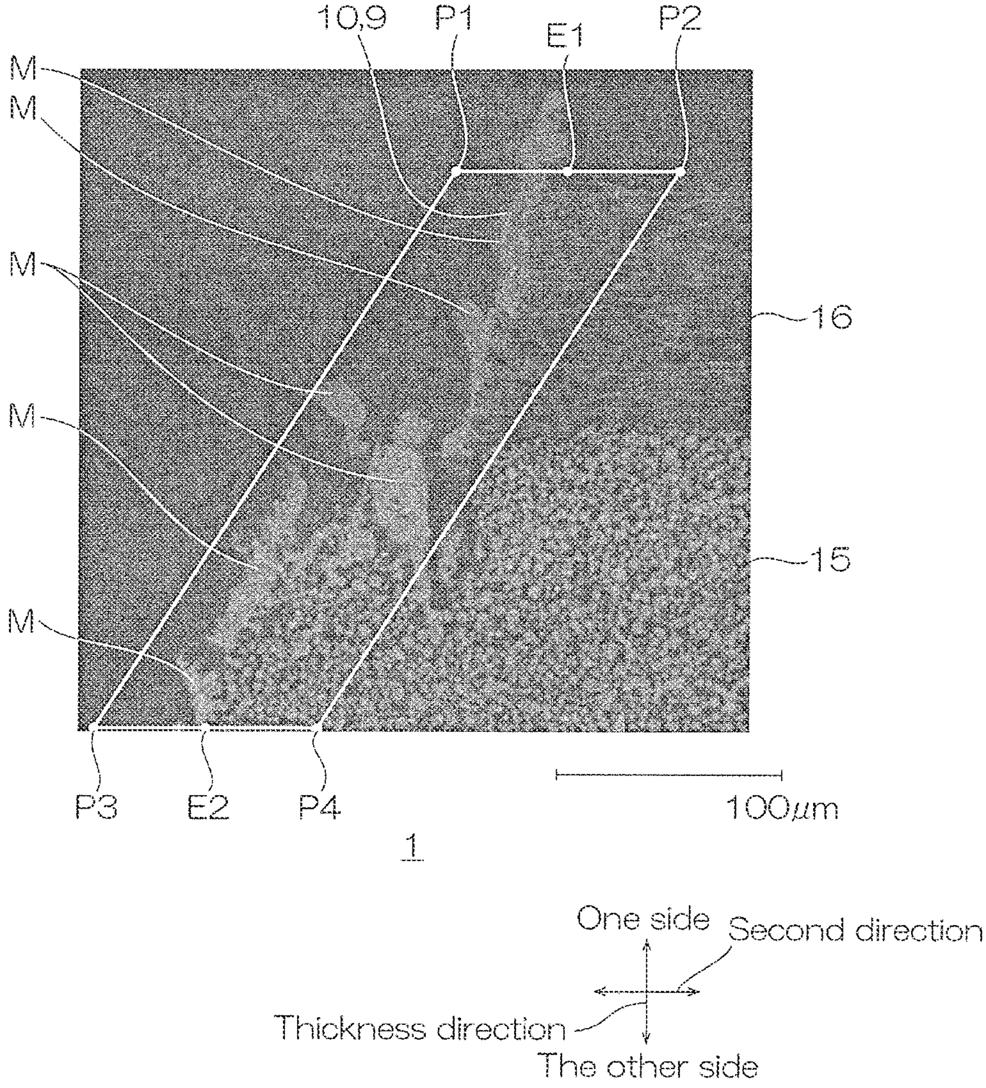
FIG. 5 is a view of a processed image of an SEM picture taken along a second direction of an inductor of Comparative Example 1.

Subsequently, an area S1 of a molten solid M located inside the quadrangle is obtained. The molten solid M is a solid formed from the magnetic particles that are molten, aggregated, and solidified, as illustrated in FIG. 5, when the via 10 is formed by the production method described below. For example, the molten solid M may be defined as below. Based on the observation of the cross-sectional SEM picture, the perimeters of the ten magnetic particles that are not molten are obtained and the average value is calculated. Further, based on the observation of the cross-sectional SEM picture, the areas of the ten magnetic particles that are not molten are obtained and the average value is calculated. The molten solid is the material having a perimeter and an area that are larger than the average value of the perimeters and the average value of the areas of the above-described ten magnetic particles, respectively.

Thereafter, the percent ($S1/S0\times100$) of the area S1 of the molten solid to the area S0 of the quadrangle is obtained.

As illustrated in FIG. 5, when the percent of the molten solid M is more than 10%, the molten solid M hinders the stable formation of the conductive member 19 described below inside the via 10.

The upper limit of the percent of the molten solid M is preferably 7.5%, more preferably 5%, even more preferably 2.5%, particularly preferably 1%, particularly preferably 0.1%, and particularly preferably 0.01%. The most preferably, the percent of the molten solid M is 0%.

The method of producing the inductor 1 will be described with reference to FIG. 6A to FIG. 6D.

The method of producing the inductor 1 includes a first step and a second step.

Figure 6A:
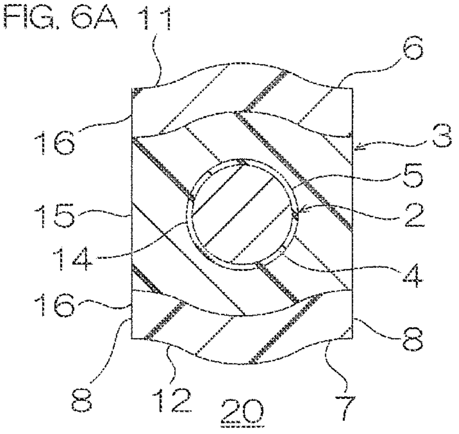
FIG. 6A to FIG. 6E are views depicting the steps of producing the inductor of FIG. 2 and the usage thereof.

As illustrated in FIG. 6A, in the first step, a magnetic laminate 20 is produced. The magnetic laminate 20 is the inductor 1 in which the via 10 is not formed yet. The magnetic laminate 20 includes the wire 2 and the magnetic layer 3. The method of producing the magnetic laminate 20 is described in detail in, for example, Japanese Unexamined Patent Publication No. 2019-165221 and Japanese Unexamined Patent Publication No. 2019-165222.

Figure 6D:
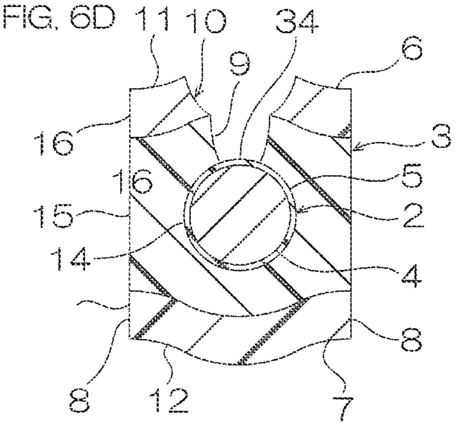
Figure 6B:
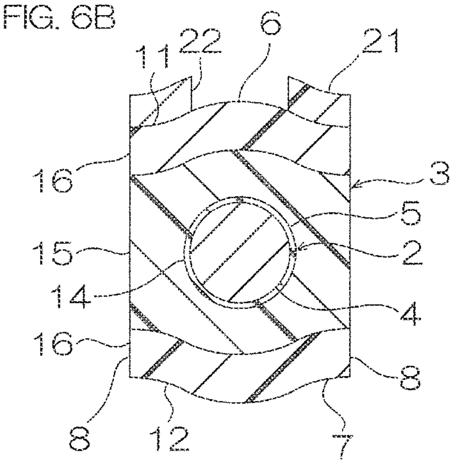
Figure 6E:
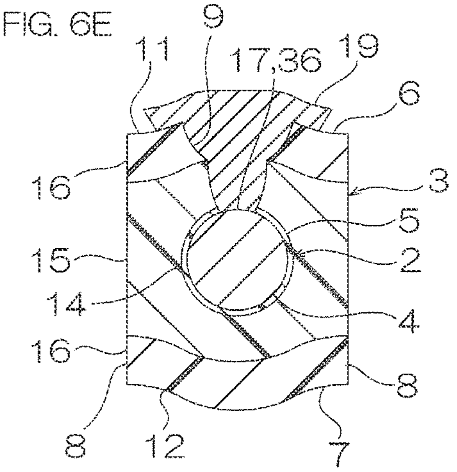
Figure 6C:
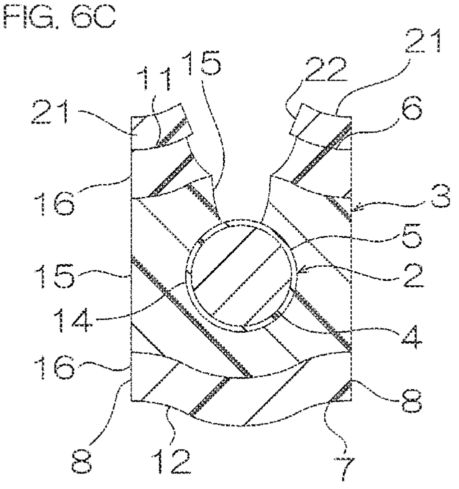
Figure 6C:
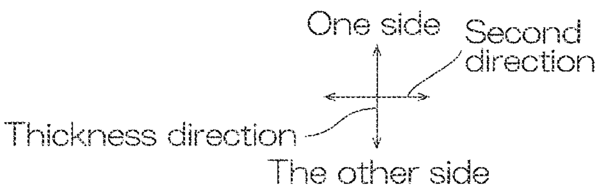

As illustrated in FIG. 6B to FIG. 6C, in the second step, the via 10 is formed in the magnetic layer 3. As the method of forming the via 10, for example, a blast method is used. The blast method includes a third step, a fourth step, and a fifth step.

As illustrated in FIG. 6B, in the third step, a resist 21 is disposed on the first principal surface 6. The resist 21 has an opening portion 22 corresponding to the via 10. The opening portion 22 penetrates the resist 21 in the thickness direction. The resist 21 is made of a material less likely to be damaged by the collision with an abrasive particle described next. The material of the resist 21 is not especially limited. A commercially available product can be used as the resist 21. For example, a commercially available "dry film resist for sandblast" can be used.

As illustrated in FIG. 6C, in the fourth step, the abrasive particle is injected to the first principal surface 6 exposed from the opening portion 22. For the injection of the abrasive particles, the abrasive particle injector (not illustrated) is used.

Although not illustrated, the abrasive particle injector includes, for example, an introduction portion, an expansion portion, a rectification portion, a collection portion, and an injection nozzle in order of a direction in which the abrasive particles flow. The introduction portion is connected to an abrasive particle tank and a gas tank. The expansion portion diffuses the abrasive particles therein. The rectification portion rectifies the flow of the abrasive particles. The collection portion gathers the abrasive particles and increases the flow pressure. The injection nozzle includes a plurality of nozzles. Each of the nozzles is a pore having an approximately circular shape. The injection nozzle injects the abrasive particles evenly from the plurality of nozzles. The structure and usage conditions of the abrasive particle injector are described in, for example, Japanese Unexamined Patent Publication No. 2015-199131. As the abrasive particle injector, a commercially available product can be used.

Specifically, examples of the material of the abrasive particles include alumina, glass beads, silicon carbide, silicon nitride, zirconia, and stainless materials. The nozzle diameter is, for example, 0.1 μm or more, preferably 0.5 μm or more and, for example, 10000 μm or less, preferably 5000 μm or less. The median size of the abrasive particle is, for example, 0.1 μm or more, preferably 0.5 μm or more and, for example, 1000 μm or less, preferably 100 μm or less. The pressure of the injection of the abrasive particles is, for example, 0.01 MPa or more, preferably 0.05 MPa or more and, for example, 10 MPa or less, preferably 5 MPa or less.

In the fourth step, the first principal surface 6 exposed from the opening portion 22 is ground. Then, the via 10 is formed in the magnetic layer 3.

As illustrated in FIG. 6D, in the fifth step, the resist 21 is removed. Specifically, the resist 21 is stripped from the first principal surface 6.

In this manner, as illustrated in FIG. 2 to FIG. 4, the inductor 1 including the wire 2, the magnetic layer 3, and the via 10 is produced.

Thereafter, as illustrated in FIG. 6E, the conductive member 19 is formed in the via 10 by, for example, plating, specifically, electrolytic plating. Before the conductive member 19 is formed, the insulating film 5 in the via 10 is stripped by a known method. The insulating film 5 can be stripped by various methods, for example, by laser processing or a blast method. Further, before the electrolytic plating, a seed layer (not illustrated) is formed. Meanwhile, the conductive member 19 is deposited from the bottom surface 17 of the via 10. Further, the conductive member 19 is deposited to the one side along the inner peripheral surface 9 in the thickness direction. Furthermore, the conductive member 19 is also formed on the one-side surface 11 around the via 10. As the material of the conductive member 19, for example, a conductor such as copper is used.

Operations and Effects of the First Embodiment

In the inductor 1, the percent of the molten solid is low, namely, 10% or less. Thus, the amount of the molten solid is small. Hence, as illustrated in FIG. 6E, the conductive member 19 can stably be formed.

Further, in the inductor 1, the inner peripheral surface 9 has the tapered surface 27 where the cross-sectional area of the opening of the via 10 gradually increases toward the first principal surface 6. Thus, when the via 10 is filled with the conductive member 19, the area of the one side of the conductive member 19 in the thickness direction can be increased. Accordingly, the inductor 1 has excellent reliability of the connection to an external device.

As illustrated in FIG. 4, on a cross section taken along the first direction, the one-side surface 34 of the wire 2 exposed to the via 10 in the thickness direction has a flat shape. Thus, the conductive member 19 can stably be formed.

As illustrated in FIG. 2 to FIG. 4, in the inductor 1 in which the conductive member 19 is not formed, a process stabilization layer 24 is disposed at the one side of a protruding edge 35 in the thickness direction and the inner peripheral surface 9. Thus, the stability when they are processed can be improved. Meanwhile, the protruding edge 35 covers the conductive wire 4. Thus, the deterioration and damage of the conductive wire 4 can be suppressed.

Further, when the magnetic particles are soft magnetic particles, the inductor 1 has excellent inductance.

Variations of the First Embodiment

Figure 7:
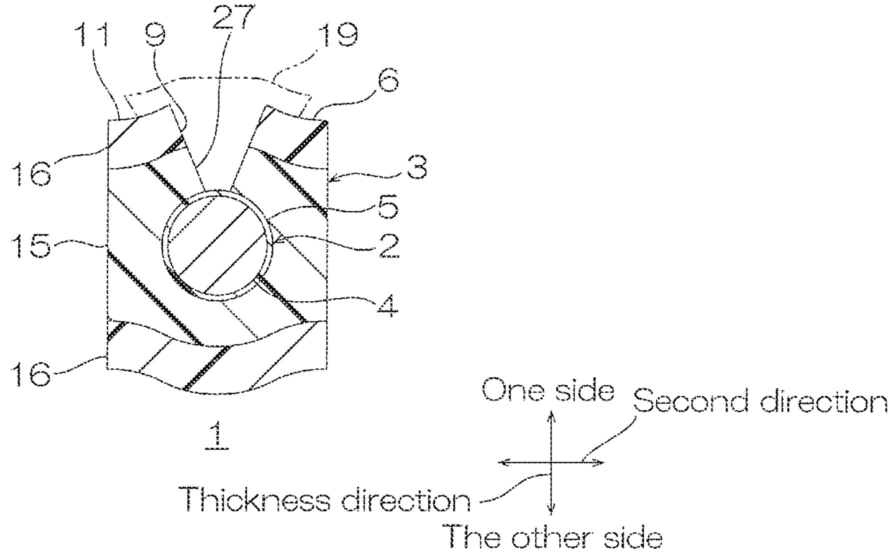
FIG. 7 is a view showing an exemplary variation of the inductor of FIG. 2.

The number of the steps 13 in the inner peripheral surface 9 may be zero or plural. The number of the steps 13 is preferably 1 or less and more preferably zero. When the number of the steps 13 is 1 or less, the conductive member 19 can more surely stably be formed. FIG. 7 depicts the inner peripheral surface 9 without a step 13.

Figure 8:
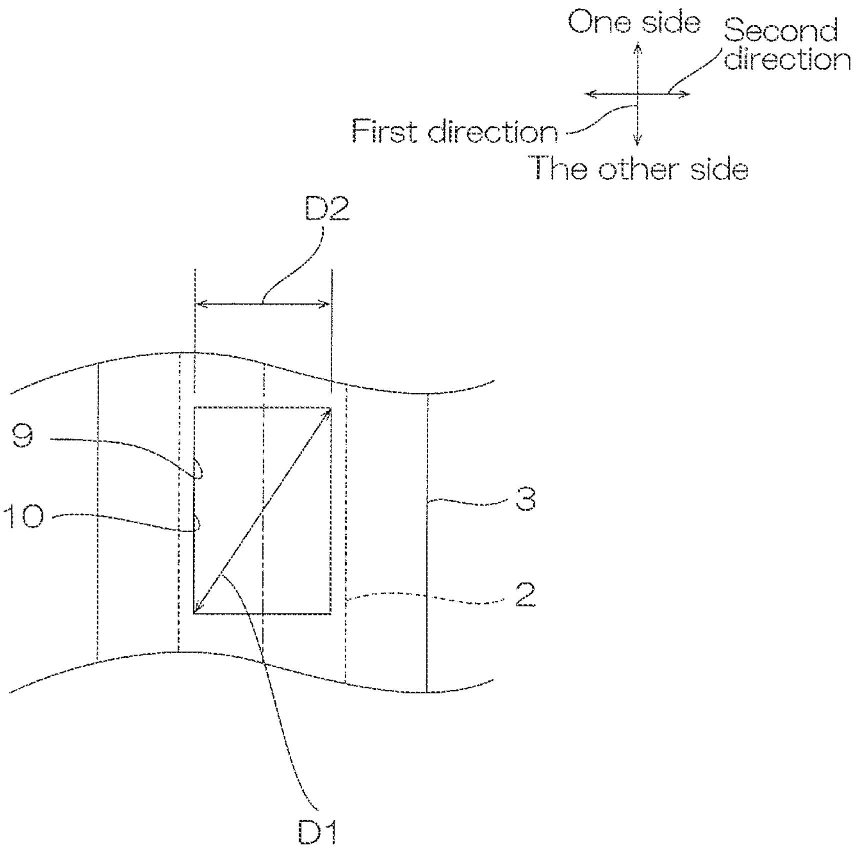
FIG. 8 is a view showing an exemplary variation of the inductor of FIG. 1.

The shape of the via 10 is not limited to an approximately circular shape in the plan view. As illustrated in FIG. 8, for example, the via 10 has an approximately rectangular shape in the plan view. In the variation, the via 10 is long in the first direction in the plan view. The via 10 has a maximum length D1 and a minimum length D2 in the plan view.

In the variation, the maximum length D1 is a distance between the two diagonal vertices of the rectangular shape of the via 10. The minimum length D2 is a length of the via 10 in the second direction. The upper limit of the ratio (D1/D2) of the maximum length D1 to the minimum length D2 is, for example, 10, preferably 5, more preferably 3, even more preferably 2. The lower limit of the ratio is, for example, 1.1, preferably 1.2. In the circular shape of the via 10, as illustrated in FIG. 1, the maximum length D1 and the minimum length D2 are the same. When the ratio (D1/D2) is small, namely, 10 or less, the conductive member 19 can stably be formed in the via 10.

Figure 9:
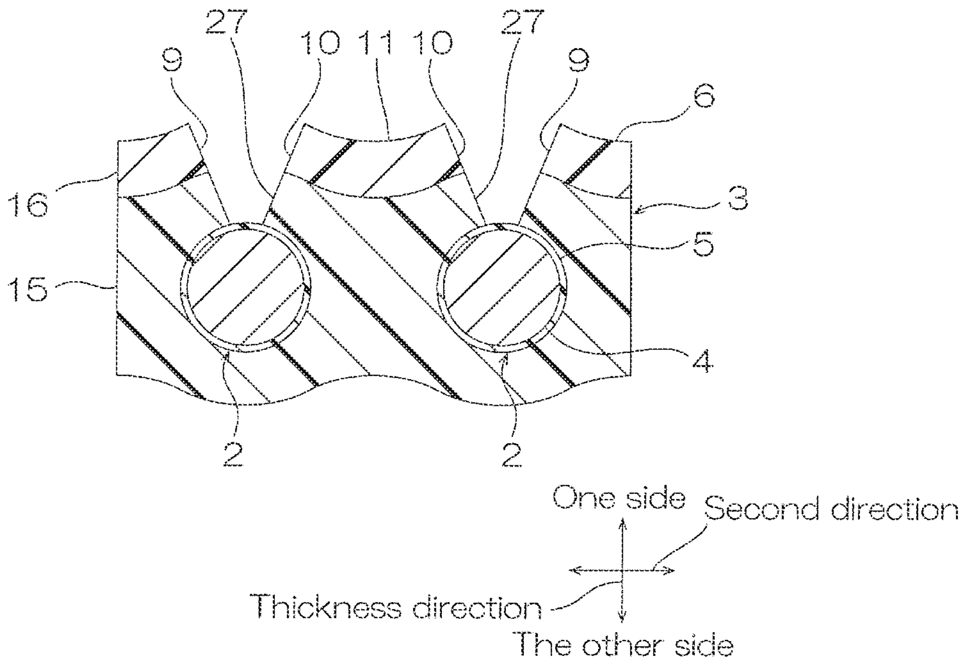
FIG. 9 is a view showing an exemplary variation of the inductor of FIG. 2.

The number of the wires 2 may be plural. As illustrated in FIG. 9, the wires 2 are disposed with a space therebetween in the second direction. The plurality of (for example, two) wires 2 are parallel in the plan view. The vias 10 are provided corresponding to the number of the wires 2.

Figure 10:
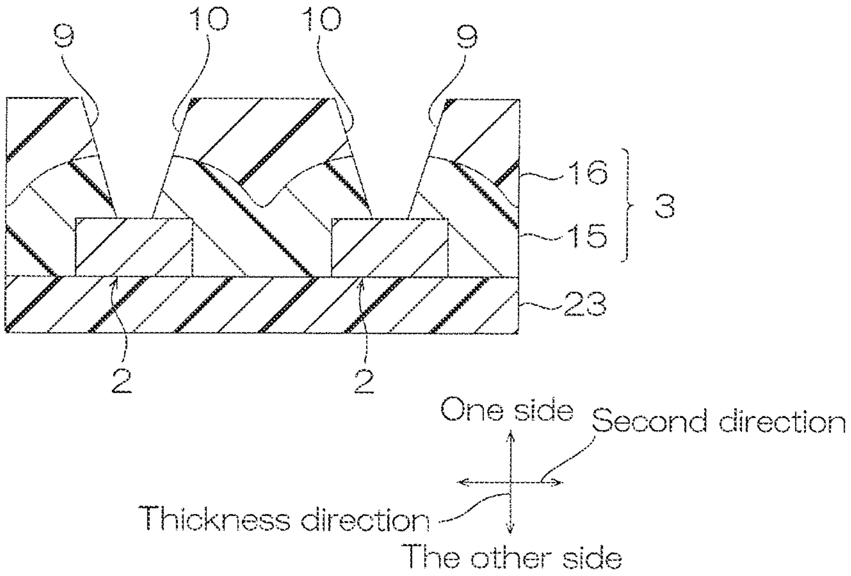
FIG. 10 is a view showing an exemplary variation of the inductor of FIG. 2.

The shape of the wire 2 is not limited. As illustrated in FIG. 10, the wire 2 can have an approximately rectangular shape in the cross section.

The other-side surface of the wire 2 in the thickness direction is in contact with an insulating layer 23. The insulating layer 23 extends in the second direction. The material of the insulating layer 23 is, for example, insulating resin such as polyimide.

In the first embodiment, a blast method is used in the method of producing the inductor 1. However, the method is not limited to the blast method. Preferably, a blast method is used. By a blast method, the production of the molten solid M can be reduced as much as possible.

Figure 11A:
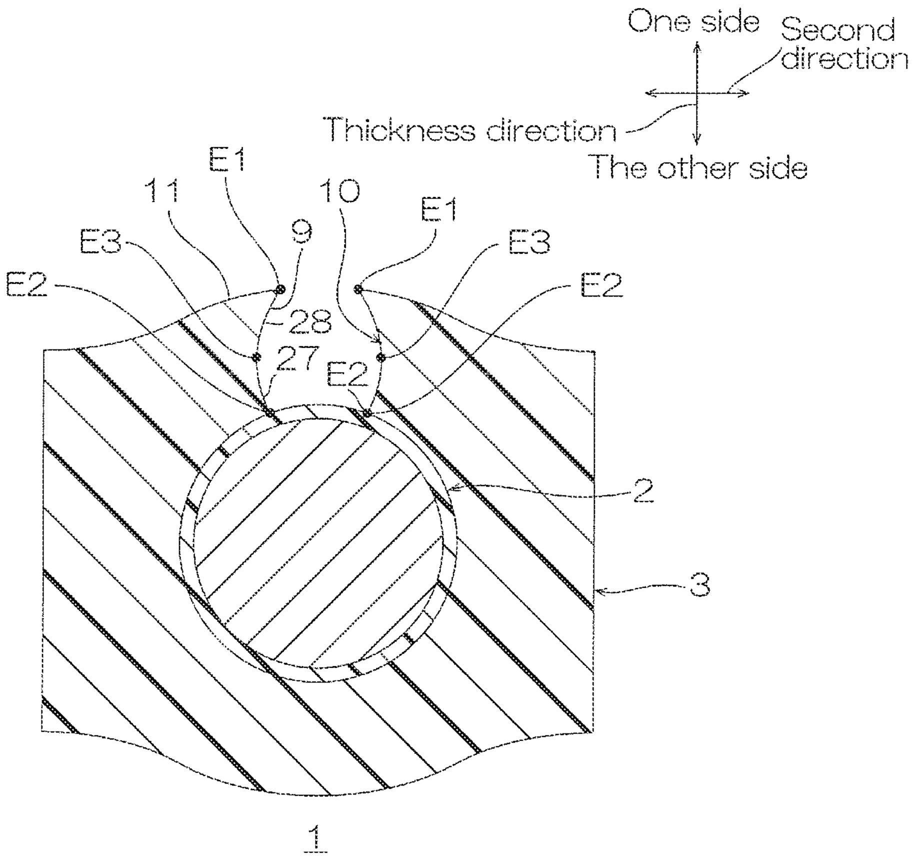
FIG. 11A and FIG. 11B are views showing exemplary variations of the first embodiment.

In another variation, as illustrated in FIG. 11A, the inner peripheral surface 9 has the tapered surface 27 and a second tapered surface 28.

The closer the tapered surface 27 approaches the one-side surface 11, the larger the cross-sectional area of the opening of the via 10 becomes.

The tapered surface 27 extends from the second edge E2 to the one side in the thickness direction.

On the other hand, the closer the second tapered surface 28 approaches the one-side surface 11, the smaller the cross-sectional area of the opening of the via 10 becomes. The second tapered surface 28 reaches from the first edge E1 to an edge of the tapered surface 27 in the thickness direction. In the inner peripheral surface 9, the tapered surface 27 and the second tapered surface 28 are disposed in order toward the one side in the thickness direction.

In the second direction, the distance between one edges of the two second tapered surfaces 28 in the thickness direction is the distance between the two first edges E1. In the second direction, relative to the distance between the two first edges E1, the ratio of the distance between the other edges E3 of the two second tapered surfaces 28 in the thickness direction is, for example, 1.1 or more, preferably 1.2 or more, more preferably 1.5 or more and, for example, 3 or less.

In the second direction, the distance between the other edges of the two second tapered surfaces 28 in the thickness direction is the distance between two second edges E3. In the second direction, relative to the distance between the two second edges E2, the ratio of the distance between the other edges E3 of the two second tapered surfaces 28 in the thickness direction is, for example, 1.1 or more, preferably 1.2 or more, more preferably 1.5 or more and, for example, 3 or less.

To produce the via 10, for example, the opening portion 22 of the resist 21 illustrated in FIG. 6B is narrowed. Specifically, the diameter of the opening portion 22 is, for example, 300 μm or less, preferably 200 μm or less.

Accordingly, in the fourth step, the abrasive particles pass through the narrow opening portion 22 and collide with the first principal surface 6 of the magnetic layer 3, and grind the magnetic layer 3. However, the abrasive particles easily remain on the other side of the peripheral edge of the opening portion 22 in the magnetic layer 3 in the thickness direction. The abrasive particles flow upstream in the injection direction. At the time, the abrasive particles form the inner peripheral surface 9 along an approximately arc-shaped trajectory. Hence, the abrasive particles form the inner peripheral surface 9 having the second tapered surface 28 and the tapered surface 27.

Figure 11B:
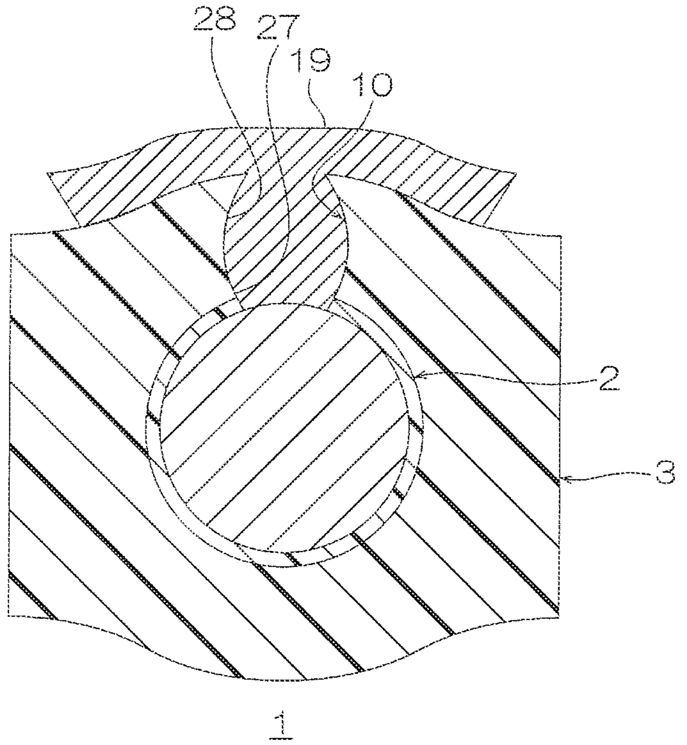

As illustrated in FIG. 11B, when the conductive member 19 is provided in the via 10, the conductive member 19 is brought into contact with the tapered surface 27 and the second tapered surface 28.

As illustrated in FIG. 11B, in the inductor 1, when the conductive member 19 is provided in the via 10, the anchor effect therebetween can suppress the fall of the conductive member 19 from the via 10

Figure 12:
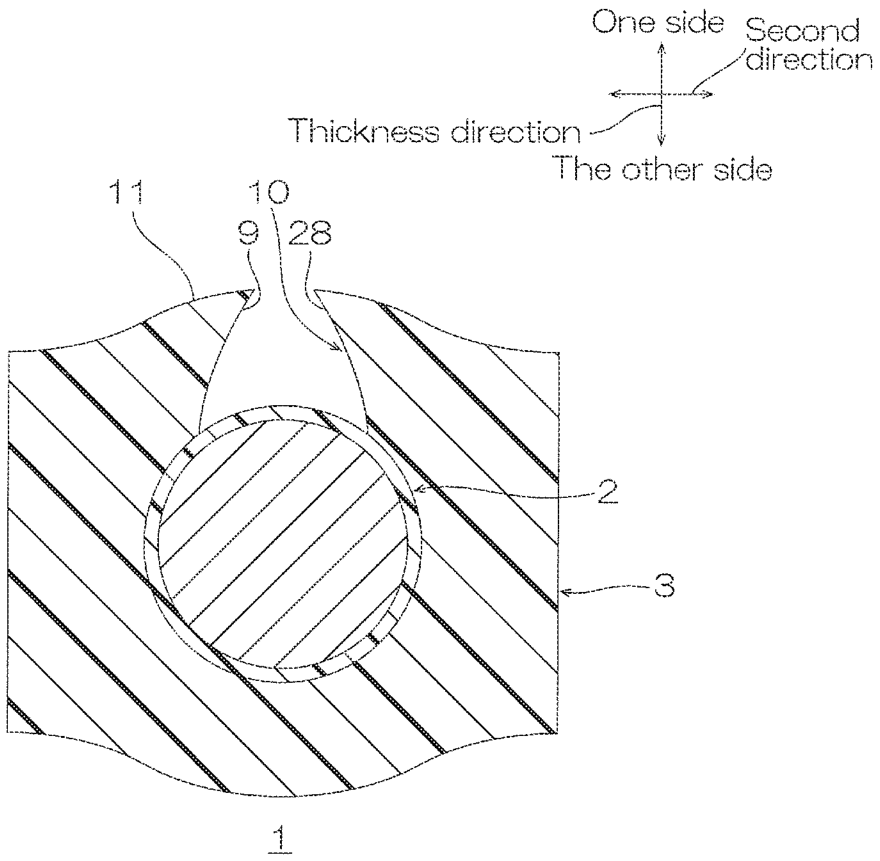
FIG. 12 is a cross-sectional view of the first embodiment of the inductor of the present invention.

As illustrated in FIG. 12, the inner peripheral surface 9 can include only the second tapered surface 28 without including the tapered surface 27.

Although not illustrated, the via 10 can be provided on both the one-side surface 11 and the other-side surface 12.

Although not illustrated, the via 10 can be provided in the magnetic layer 3 at one end of the wire 2 in the first direction.

Second Embodiment

In the second embodiment, the same members and steps as in the first embodiment will be given the same numerical references and the detailed description will be omitted. Further, the second embodiment can have the same operations and effects as those of the first embodiment unless especially described otherwise. Furthermore, the first embodiment and the second embodiment can appropriately be combined.

Figure 13:
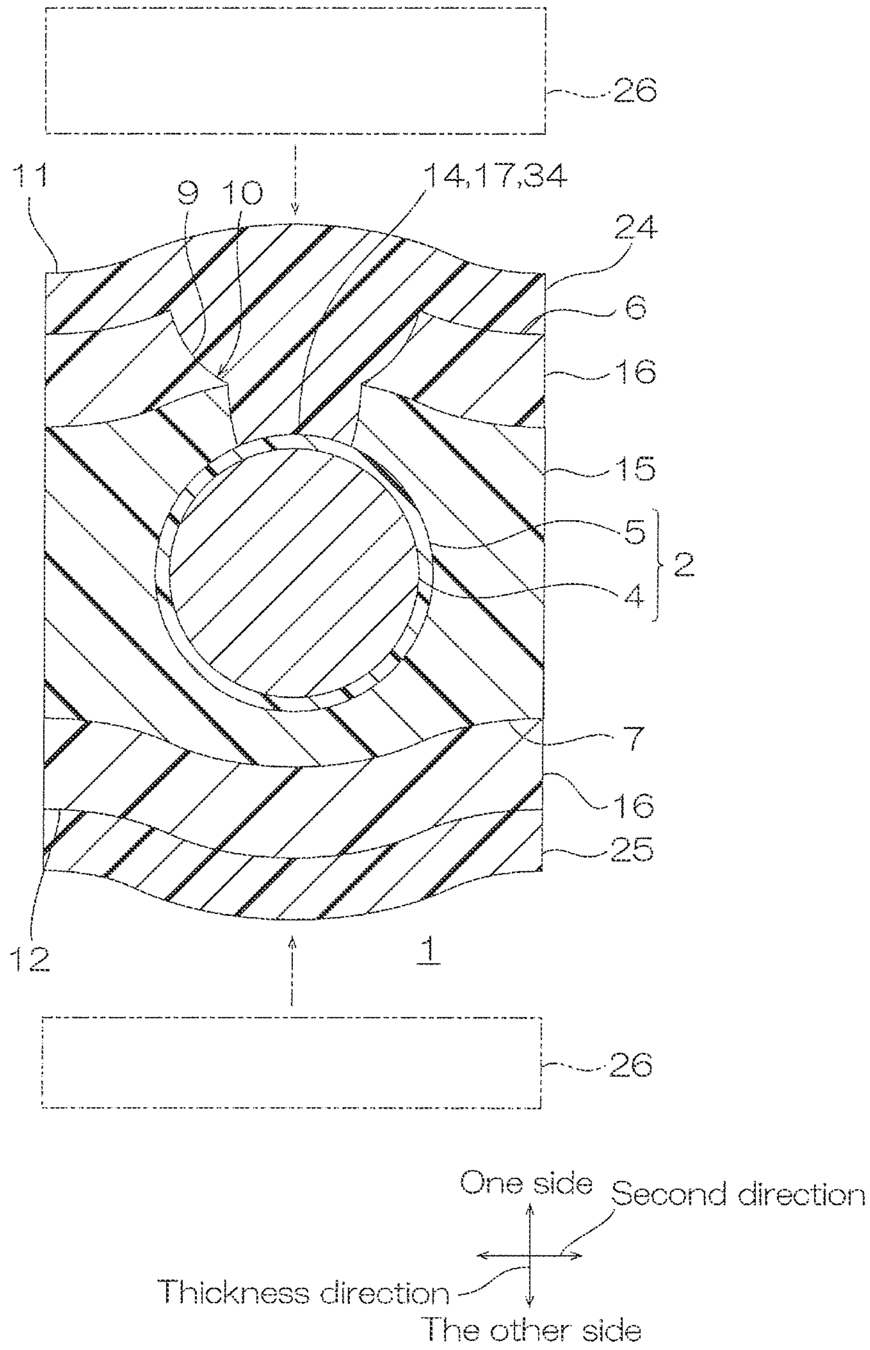
FIG. 13 is a cross-sectional view of a second embodiment of the inductor of the present invention.

As illustrated in FIG. 13, an inductor 1 further includes a process stabilization layer 24 and a second process stabilization layer 25.

The process stabilization layer 24 fills the via 10. Further, the process stabilization layer 24 is also disposed on the first principal surface 6. The process stabilization layer 24 improves the surface processability on the first principal surface 6 of the magnetic layer 3, and the surface processability on the inner peripheral surface 9 of the via 10 and the via 10. Further, the process stabilization layer 24 is an insulating layer that can ensure the insulation between the conductive member 19 and the magnetic layer 3 when the conductive member 19 is disposed in a penetration pore 30 described below (see FIG. 14 and the third embodiment).

The process stabilization layer 24 includes a cured product of a thermosetting resin composition. In other words, the material of the process stabilization layer 24 includes a cured product of a thermosetting resin composition. The thermosetting resin composition includes thermosetting resin as an essential component.

The thermosetting resin includes a base compound, a curing agent, and a curing accelerator.

Examples of the base compound include epoxy resin and silicone resin. Preferably, epoxy resin is used. Examples of the epoxy resin include bifunctional epoxy resins such as bisphenol A epoxy resin, bisphenol F epoxy resin, bisphenol S epoxy resin, modified bisphenol A epoxy resin, modified bisphenol F epoxy resin, modified bisphenol S epoxy resin, biphenyl epoxy resin, and trifunctional or more, namely, multifunctional epoxy resins such as phenol novolak epoxy resin, cresol novolak epoxy resin, trishydroxyphenylmethane epoxy resin, tetraphenylolethane epoxy resin, and dicyclopentadiene epoxy resin. These epoxy resins can be used singly or in combination. Preferably, bifunctional epoxy resin is used. More preferably, bisphenol A epoxy resin is used.

The lower limit of the epoxy equivalent of the epoxy resin is, for example, 10 g/eq and the upper limit thereof is, for example, 1,000 g/eq.

When the base compound is epoxy resin, examples of the curing agent include phenolic resin and isocyanate resin. Examples of the phenolic resin include multifunctional phenolic resins such as phenol novolak resin, cresol novolak resin, phenol aralkyl resin, phenol biphenylene resin, dicyclopentadiene phenol resin, and resol resin. These resins can be used singly or in combination. Preferable examples of the phenolic resin include phenol novolak resin and phenol biphenylene resin. When the base compound is epoxy resin and the curing agent is phenolic resin, relative to 1 equivalent of an epoxy group in the epoxy resin, the lower limit of the total of the hydroxyl groups in the phenolic resin is, for example, 0.7 equivalent, preferably 0.9 equivalent and the upper limit thereof is, for example, 1.5 equivalent, preferably 1.2 equivalent. Specifically, the lower limit of the parts by mass of the curing agent is, relative to 100 parts by mass of the base compound is, for example, 1 part by mass or, for example, 50 parts by mass.

The curing accelerator is a catalyst (thermosetting catalyst) that accelerates the curing of the base compound (preferably, epoxy resin curing accelerator). Examples thereof include imidazole compounds such as an organic phosphorus compound and 2-phenyl-4-methyl-5-hydroxymethylimidazole (2P4 MHZ). The lower limit of the parts by mass of the curing accelerator relative to 100 parts by mass of the base compound is, for example, 0.05 parts by mass and the upper limit thereof is, for example, 5 parts by mass.

Further, the thermosetting resin composition can include, for example, particles as an optional component. The particles are dispersed in the thermosetting resin. The particles are at least ones selected from a group consisting of first particles and second particles.

The first particles each have, for example, an approximately spherical shape. The lower limit of the median size of the first particles is, for example, 1 μm, preferably 5 μm and the upper limit of the median size of the first particles is, for example, 250 μm, preferably 200 μm. The median size of the first particles can be obtained by a laser diffraction particle size distribution analyzer. Alternatively, the median size of the first particles can be obtained by, for example, a binarization process with the observation of the cross-section.

The material of the first particles is not especially limited. Examples of the first particles include metals, inorganic compounds, and organic compounds. To increase the thermal expansion coefficient, preferably, metals and inorganic compounds are used.

The metals are included in the thermosetting resin composition to allow the process stabilization layer 24 to function as an inductance improving layer. Examples of the metals include the magnetic body exemplified as the magnetic layer 3. Preferably, an organic iron compound including iron as the first metal element is used. More preferably, carbonyl iron is used.

The inorganic compound is included in the thermosetting resin composition to allow the process stabilization layer 24 to function as a thermal expansion coefficient suppressing layer. Examples of the inorganic compound include inorganic fillers. Specifically, silica and alumina are used. Preferably, silica is used.

Specifically, as the first particles, preferably, spherical silica is used. Or, preferably, spherical carbonyl iron is used.

The second particles each have, for example, an approximately flat shape. The approximately flat shape includes an appropriately plate shape.

The lower limit of the flakiness (degree of flakiness) (flattering, oblateness) of the second particles is, for example, 8, preferably 15. Meanwhile the upper limit thereof is, for example, 500, preferably 450.

The lower limit of the median size of the second particles is, for example, 1 μm, preferably 5 μm. The upper limit of the median size of the second particles is, for example, 250 μm, preferably 200 μm. The median size of the second particles can be obtained by the same method as that of the first particles.

The lower limit of the average thickness of the second particles is, for example, 0.1 μm, preferably 0.2 μm and the upper limit thereof is, for example, 3.0 μm, preferably 2.5 μm.

Examples of the material of the second particles include an inorganic compound. Examples of the inorganic compounds include thermal conductive compounds such as boron nitride. Accordingly, the inorganic compound is preferably included in the thermosetting resin composition to allow the process stabilization layer 24 to function as a thermal conductivity improving layer.

Specifically, as the second particles, preferably, flat boron nitrides are used.

One or both of the first particles and the second particles is/are included in the thermosetting resin composition.

The lower limit of the parts by mass of the particles (the first particles and/or the second particles) relative to 100 parts by mass of the thermosetting resin is, for example, 10 parts by mass, preferably 50 parts by mass and the upper limit thereof is, for example, 2,000 parts by mass, preferably 1,500 parts by mass. Meanwhile, the lower limit of the content of the particles in the cured product is, for example, 10 mass %, and the upper limit thereof is, for example, 90 mass %. When both of the first particles and the second particles are included in the thermosetting resin composition, the lower limit of the parts by mass of the second particles relative to 100 parts by mass of the first particles is, for example, 30 parts by mass, and the upper limit thereof is, for example, 300 parts by mass.

The particles are an optional component in the thermosetting resin composition. Thus, the thermosetting resin composition does not necessarily include the particles.

Alternatively, the material of the process stabilization layer 24 can further include thermoplastic resin. The lower limit of the parts by mass of the thermoplastic resin relative to 100 parts by mass of the thermosetting resin is, for example, 1 part by mass, and the upper limit thereof is, for example, 100 parts by mass.

The lower limit of the thickness of the process stabilization layer 24 is, for example, 1 μm, preferably 10 μm and, the upper limit thereof is, for example, 1,000 μm, preferably 100 m. The lower limit of the ratio of the thickness of the process stabilization layer 24 to the thickness of the inductor 1 is, for example, 0.001, preferably 0.005, more preferably 0.01, and the upper limit thereof is, for example, 0.5, preferably 0.3, more preferably 0.1. The thickness of the process stabilization layer 24 is the minimum length between the first principal surface 6 and a one-side surface of the process stabilization layer 24 in the thickness direction.

The second process stabilization layer 25 is disposed on the other-side surface 12 of the inductor 1. The second process stabilization layer 25 improves the surface processability on the other-side surface 12 of the inductor 1. The second process stabilization layer 25 includes a cured product of a thermosetting resin composition. The material of the second process stabilization layer 25 includes the thermosetting resin composition exemplified in the description of the process stabilization layer 24. The lower limit of the thickness of the second process stabilization layer 25 is, for example, 1 μm, preferably 10 μm, and the upper limit thereof is, for example, 1,000 μm, preferably 100 μm. The lower limit of the ratio of the thickness of the second process stabilization layer 25 to the thickness of the inductor 1 is, for example, 0.001, preferably 0.005, more preferably 0.01, and the upper limit thereof is, for example, 0.5, preferably 0.3, more preferably 0.1. The thickness of the second process stabilization layer 25 is the minimum length between the second principal surface 7 and the other-side surface of the second process stabilization layer 25 in the thickness direction.

To produce the inductor 1 of the second embodiment, as the phantom lines in FIG. 13 show, two process stabilization sheets 26 are prepared. The two process stabilization sheets 26 are formed into sheet shapes from the materials of the process stabilization layer 24 and the second process stabilization layer 25, respectively. The process stabilization sheets 26 preferably include the thermosetting resin composition in a B stage. The above-described material can be prepared as varnish by further blending a solvent in the above-described thermosetting resin composition. Furthermore, the thermoplastic resin can further be blended in the material. In this method, the varnish is applied and dried on a surface of a releasable sheet not illustrated, thereby forming the process stabilization sheets 26.

Subsequently, the two process stabilization sheets 26 and the inductor 1 are pressed from both sides in the thickness direction. Thereafter, they are heated, thereby C-staging the two process stabilization sheets 26. In this manner, the process stabilization layer 24 disposed on the first principal surface 6 of the magnetic layer 3, the inner peripheral surface 9 of the via 10, and the one-side surface 34 of the insulating film 5 in the thickness direction and the second process stabilization layer 25 disposed on the second principal surface 7 of the magnetic layer 3 are included in the inductor 1.

Operations and Effects of the Second Embodiment

In the inductor 1 of the second embodiment, the process stabilization layer 24 fills the via 10. Thus, the stability when the via 10 is subjected to the following process (the third embodiment described below) can be improved.

Third Embodiment

In the third embodiment, the same members and steps as in the first and second embodiments will be given the same numerical references and the detailed description will be omitted. Further, the third embodiment can have the same operations and effects as those of the first and second embodiments unless especially described otherwise. Furthermore, the first to third embodiments can appropriately be combined.

Figure 14:
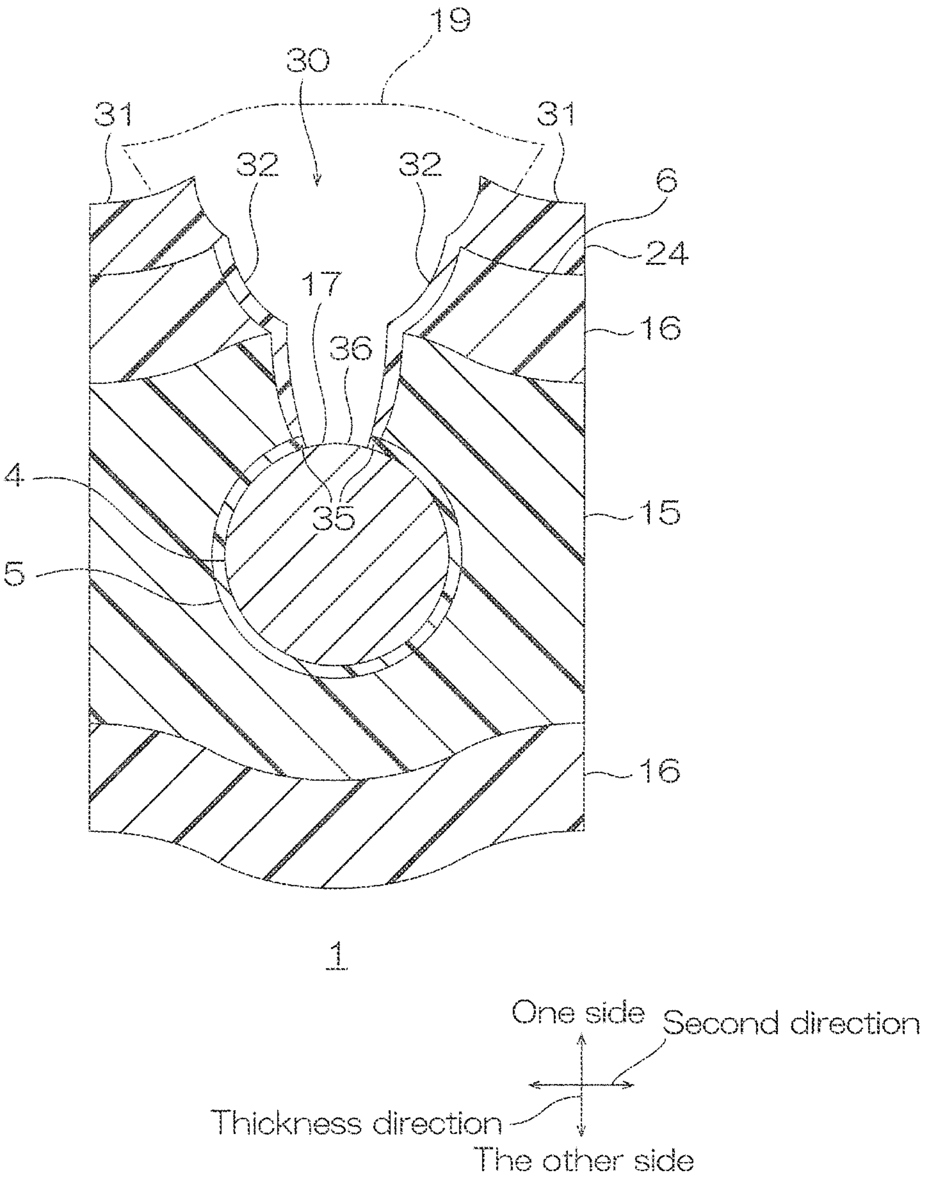
FIG. 14 is a cross-sectional view of a third embodiment of the inductor of the present invention.

As illustrated in FIG. 14, the one-side surface 36 of the conductive wire 4 in the thickness direction is exposed to the one side in the thickness direction. For example, the one-side surface 36 of the conductive wire 4 in the thickness direction is exposed from the process stabilization layer 24 and a part of the insulating film 5.

The process stabilization layer 24 includes a first covering portion 31 and a second covering portion 32. The first covering portion 31 follows and covers the first principal surface 6. The first covering portion 31 is located on a one-side surface of the first principal surface 6 in the thickness direction. The second covering portion 32 follows and covers an inner peripheral surface 9 of the via 10. The second covering portion 32 overlaps the inner peripheral surface 9 when being projected in the second direction (or the first direction). Further, the second covering portion 32 is along with the thickness direction. The other-side surface of the second covering portion 32 in the thickness direction is brought into contact with the protruding edge 35 of the insulating film 5 from the one side in the thickness direction. The other side surface of the second covering portion 32 in the thickness direction is a surface located at a side opposite to the first covering portion 31 in the second covering portion 32. The protruding edge 35 is a part of the insulating film 5. The protruding edge 35 has an approximately ringed shape in the plan view. The ringed shape of the protruding edge 35 is not illustrated in FIG. 14. The protruding edge 35 exposes a part of the one-side surface 36 of the conductive wire 4 in the thickness direction therein. An inner side surface of the protruding edge 35 is flush with an inner side surface of the second covering portion 32.

In this manner, the protruding edge 35 of the insulating film 5 and the second covering portion 32 of the process stabilization layer 24 expose the one-side surface 36 of the conductive wire 4 in the thickness direction toward the one side in the thickness direction.

The via 10 is defined by the second covering portion 32 of the process stabilization layer 24, the protruding edge 35 of the insulating film 5, and the one-side surface 36 of the conductive wire 4 in the thickness direction.

To form the via 10, the process stabilization layer 24 of the second embodiment is subjected to, for example, a perforation process. Examples of the perforation process include laser processing.

Operations and Effects of the Third Embodiment

In the inductor 1, the one-side surface 36 of the conductive wire 4 in the thickness direction is exposed from the second covering portion 32 and the protruding edge 35.

Thus, when the conductive member 19 is provided on the one-side surface 36, the conductive wire 4 can electrically be connected to an external device.

Meanwhile, when the process stabilization layer 24 is an insulating layer, the process stabilization layer 24 can intervene between the conductive member 19 and the magnetic layer 3 and thus can improve their insulation.

EXAMPLES

The present invention will be more specifically described below with reference to Examples and Comparison Example. The present invention is not limited to Examples and Comparison Example in any way. The specific numeral values used in the description below, such as mixing ratios (contents), physical property values, and parameters can be replaced with corresponding mixing ratios (contents), physical property values, parameters in the above-described "DESCRIPTION OF EMBODIMENTS", including the upper limit value (numeral values defined with "or less", and "less than") or the lower limit value (numeral values defined with "or more", and "more than").

Example 1

Example Corresponding to the First Embodiment

As illustrated in FIG. 6A, first, a magnetic laminate 20 was produced. Specifically, a plurality of wires 2 each having a radius of 115 μm was covered with a magnetic layer 3 made from a first magnetic sheet with a thickness of 100 μm and a second magnetic sheet with a thickness of 125 μm. The first magnetic sheet included 61.5 vol % of spherical magnetic powders, 9.6 vol % of cresol novolak epoxy resin (the base compound), 9.6 vol % of phenolic resin (the curing agent), 0.5 vol % of polyether phosphate ester (dispersant), 0.3 vol % of the imidazole compound (the curing accelerator), and 18.5 vol % of the thermoplastic resin (carboxyl group-containing acrylic acid ester copolymer). Meanwhile, the second magnetic sheet included 55 vol % of the magnetic particles made of flat Fe—Si alloys, 11.0 vol % of cresol novolak epoxy resin (the base compound), 11.0 vol % of phenolic resin (the curing agent), 0.4 vol % of polyether phosphate ester (dispersant), 0.4 vol % of the imidazole compound (the curing accelerator), and 21.2 vol % of the thermoplastic resin (carboxyl group-containing acrylic acid ester copolymer).

As illustrated in FIG. 6B, a resist 21 was formed on a first principal surface 6 of an insulating film 5. An opening portion 22 was formed in the resist 21 through a photolithography process. The opening portion 22 had a circular shape in the plan view. The opening portion 22 had a diameter of 250 μm.

As illustrated in FIG. 6C, a via 10 was formed by a blast method. An inner peripheral surface 9 of the via 10 had a tapered surface 27.

The conditions for the blast method will be described below.

Nozzle diameter: 2 mm
Material of the abrasive particles: alumina
Median size of the abrasive particles: 14 μm
Injection velocity: 0.4 MPa Subsequently, illustrated in FIG. 6D, the resist 21 was stripped from the first principal surface 6.

In this manner, an inductor 1 was produced.

Example 2

Example Corresponding to the Second Embodiment

As illustrated in FIG. 13, a process stabilization layer 24 and a second process stabilization layer 25 were included in the inductor 1 of Example 1.

Specifically, first, as the phantom lines in FIG. 13 show, two process stabilization sheets 26 were prepared. The process stabilization sheets 26 were formed by applying and drying varnish including 935 parts by mass of spherical silica particles (the first particles), 100 parts by mass of bisphenol A epoxy resin (the base compound of thermosetting resin), 106 parts by mass of phenolic resin (the curing agent), 4 parts by mass of the imidazole compound (the curing accelerator), and 10 parts by mass of cyclohequinone (solvent). The content of the silica particles in the process stabilization sheets 26 was 55 vol %. The process stabilization sheets 26 each had a thickness of 40 μm. The process stabilization sheets 26 were in a B stage.

The two process stabilization sheets 26 and the inductor 1 were pressed from both sides in a thickness direction. Thereafter, the process stabilization sheets 26 were C staged.

Example 3

Example Corresponding to the Third Embodiment

As illustrated in FIG. 14, a via 10 was formed on the process stabilization layer 24 of Example 2.

Specifically, using a laser device, the via 10 was formed in a process stabilization layer 24.

Thereafter, as illustrated in FIG. 6E, a seed layer (not illustrated) was formed in the via 10 by electroless copper plating, and then a conductive member 19 was formed by copper electroplating. The conductive member 19 was formed in a smooth way.

Example 4

Except that the diameter of an opening portion 22 was changed into 100 μm, the same process as in Example 1 was carried out. As illustrated in FIG. 11A, an inner peripheral surface 9 had a tapered surface 27 and a second tapered surface 28.

In a second direction, the distance between two first edges E1 was 105 μm, the distance between two second edges E2 was 85 μm, and the distance between two other edges E3 of the second tapered surfaces 28 in the thickness direction was 122 μm.

Comparative Example 1

Except that the blast method was changed to laser processing in the formation of the via, the same process as in Example 1 was carried out. A conductive wire 4 was exposed by the laser processing. Further, an attempt to form a conductive member 19 by copper electroplating was made. However, the formation of the conductive member 19 was failed.

Evaluation

SEM observation, the rate of the molten solid M, and the formation of the conductive member The observation of the cross sectional SEM image of each of Examples and Comparative Example was carried out. The view of the processed image of an SEM picture in the second direction of Example 1 is showed in FIG. 3. The view of the processed image of an SEM picture in the first direction of Comparative Example 1 is showed in FIG. 5.

Further, the percent of the molten solid M was obtained. The results were shown in Table 1.

Furthermore, in the cross-sectional SEM image, the conductive member 19 on the bottom surface 17 and inner peripheral surface 9 of the via 10 were observed. Then, the formation of the conductive member 19 was evaluated by the following criteria.

[Good]

The conductive member 19 was formed without molten solid M.

[Failed]

The conductive member 19 was formed through molten solid M.

TABLE 1

| Example* Comparison Example | State of Conductive Wire | Formation of Conductive Member | Rate of Molten Solid M (%) |
|---|---|---|---|
| Example 1 | Covered with Insulating Film | — | 0 |
| Example 2 | Covered with Insulating Film | — | 0 |
| Example 3 | Exposed | Good | 0 |
| Example 4 | Covered with Insulating Film | — | 0 |
| Comparison Example 1 | Exposed | Failed | 28 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

DESCRIPTION OF REFERENCE NUMERALS

1 inductor
2 wire
3 magnetic layer
4 conductive wire
5 insulating film
6 first principal surface
7 second principal surface
9 inner peripheral surface
10 via
11 one-side surface
13 step
24 process stabilization layer
27 tapered surface
28 second tapered surface
34 one-side surface
35 protruding edge
36 one-side surface
M molten solid
P1 first point
P2 second point
P3 third point
P4 fourth point
E1 first edge
E2 second edge

The invention claimed is:

1. An inductor comprising:

a wire, and a magnetic layer embedding the wire and containing magnetic particles, wherein the magnetic layer has a first principal surface disposed at one side relative to the wire in a thickness direction with a space between the first principal surface and the wire, a second principal surface disposed at an opposite side of the first principal surface relative to the wire with a space between the first principal surface and the second principal surface in the thickness direction, and a via penetrating from the first principal surface toward the wire, wherein the via has an inner peripheral surface when viewed in the thickness direction, and wherein a percent of molten solid obtained from the magnetic particles by a following method is 10% or less:

on a cross-section across the via, a first point and a second point are located at one side and the other side in a direction in which the first principal surface extends and are kept 50 μm away from an edge on one side of the inner peripheral surface in the thickness direction, and a third point and a fourth point are located at one side and the other side in the extending direction and are kept 50 μm away from an edge on the other side of the inner peripheral surface in the thickness direction, an area S0 of a quadrangle having the first point, the second point, the third point, and the fourth point as vertices is obtained, an area S1 of the molten solid located inside the quadrangle is obtained, and a percent (S1/S0×100) of the area S1 of the molten solid to the area S0 of the quadrangle is obtained.

2. The inductor according to claim 1, wherein the number of steps on the inner peripheral surface in the via is 1 or less.

3. The inductor according to claim 1, wherein the inner peripheral surface has a tapered surface where a cross-sectional area of an opening of the via gradually increases toward the first principal surface.

4. The inductor according to claim 1, wherein a one-side surface of the wire in the thickness direction exposed from the via has a flat shape on a cross section on which the wire extends.

5. The inductor according to claim 1, wherein the wire includes a conductive wire and an insulating film disposed on a peripheral surface of the conductive wire, and the insulating film is exposed from the via.

6. The inductor according to claim 1, further comprising: a process stabilization layer filling the via.

7. The inductor according to claim 6, wherein the inner peripheral surface has a second tapered surface where a cross-sectional area of an opening of the via gradually decreases toward the first principal surface.

8. The inductor according to claim 1, wherein the wire includes a conductive wire and an insulating film disposed on a peripheral surface of the conductive wire, the insulating film having a protruding edge protruding inwardly from the other edge of the inner peripheral surface in the via, the inductor further includes a process stabilization layer disposed on a one-side surface of the protruding edge in the thickness direction and on the inner peripheral surface, and the protruding edge and the process stabilization layer expose a one-side surface of the conductive wire in the thickness direction.

9. The inductor according to claim 6, wherein the process stabilization layer is further disposed on the first principal surface.

10. The inductor according to claim 1, wherein the magnetic particles are soft magnetic particles.

11. The inductor according to claim 1, wherein the via has a maximum length D1 and a minimum length D2 in a surface direction orthogonal to the thickness direction, and a ratio (D1/D2) of the maximum length D1 to the minimum length D2 is 10 or less.

* * * * *